US012113818B2

(12) United States Patent
Douglas et al.

(10) Patent No.: US 12,113,818 B2
(45) Date of Patent: Oct. 8, 2024

(54) MACHINE LEARNING FOR COMPUTER SECURITY

(71) Applicant: Capital One Services, LLC, McLean, VA (US)

(72) Inventors: Lawrence Douglas, McLean, VA (US); Jeffrey Rule, Chevy Chase, MD (US); Jackson Macomber, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 169 days.

(21) Appl. No.: 17/812,428

(22) Filed: Jul. 13, 2022

(65) Prior Publication Data

US 2024/0022582 A1 Jan. 18, 2024

(51) Int. Cl.
*H04L 9/40* (2022.01)
*H04L 41/16* (2022.01)

(52) U.S. Cl.
CPC .......... *H04L 63/1425* (2013.01); *H04L 41/16* (2013.01); *H04L 63/107* (2013.01)

(58) Field of Classification Search
CPC .... H04L 63/1425; H04L 63/107; H04L 41/16
See application file for complete search history.

(56) References Cited

U.S. PATENT DOCUMENTS

| | | | | |
|---|---|---|---|---|
| 8,949,825 | B1* | 2/2015 | Fitzgerald | G06F 9/45537 718/1 |
| 10,949,535 | B2* | 3/2021 | Luo | G06N 20/20 |
| 10,965,675 | B2* | 3/2021 | Zhang | H04L 63/08 |
| 11,356,462 | B2* | 6/2022 | Shannon | H04L 63/1425 |
| 11,528,261 | B2* | 12/2022 | Aslaksen | H04L 63/1441 |
| 11,824,832 | B2* | 11/2023 | Dalvi | H04L 63/0236 |
| 11,983,094 | B2* | 5/2024 | Downie | G06F 11/366 |
| 2015/0150006 | A1* | 5/2015 | Fitzgerald | G06F 21/53 718/1 |
| 2018/0368007 | A1* | 12/2018 | Cummings | H04L 67/51 |
| 2019/0391798 | A1* | 12/2019 | Farrell | G06F 11/3672 |
| 2020/0153852 | A1* | 5/2020 | Segal | H04L 63/1433 |
| 2020/0280577 | A1* | 9/2020 | Segal | H04L 63/20 |
| 2020/0412695 | A1* | 12/2020 | Wittler | H04L 63/0236 |
| 2021/0382989 | A1* | 12/2021 | Wei | G06F 21/552 |
| 2022/0391507 | A1* | 12/2022 | Dalton | G06F 21/554 |

* cited by examiner

Primary Examiner — Viral S Lakhia
(74) Attorney, Agent, or Firm — Foley & Lardner LLP

(57) ABSTRACT

A computing system may obtain text corresponding to a conversation between an outside caller and an agent. The computing system may obtain data associated with the conversation that may be used to determine whether the outside caller is attempting malicious activity or not. The obtained text and data may be provided to a machine learning model to generate a probability score indicative of whether the outside caller is attempting to obtain unauthorized access or attempting other malicious activity. Based on determining that the probability score satisfies a threshold, the computing system may modify a permission (e.g., an API permission) of the agent. The computing system may deny the request to perform the action and may cause display of an indication that the request was successful.

18 Claims, 5 Drawing Sheets

MACHINE LEARNING FOR COMPUTER SECURITY

BACKGROUND

An application programming interface (API) is a set of programming code that enables data transmission between one software product and another. It also contains the terms of this data exchange. APIs are often used by software services. A software service may provide telecommunication and other services. An endpoint of a software service may be used to respond to incoming communications to assist users of the software service. A computing system may grant one or more permissions to software service endpoints to perform actions via an API (e.g., modifying a database, generating accounts, etc.) on behalf of users communicating with the endpoints. Because software service endpoints are granted permissions to make changes or access data on computing systems, the endpoints are often targeted by malicious actors to deliver sensitive customer details that can later be used in account takeovers or other malicious activities.

SUMMARY

With conventional computing systems, it is all too easy for malicious actors to identify and take advantage of weak points in a cyber security system. For example, a software service endpoint (e.g., device) may be co-opted by a malicious actor to send sensitive information to the malicious actor. Because of the permissions conventional computing systems grant to an endpoint, a malicious actor may target the endpoint to obtain information about users or cause the endpoint to perform other actions that the permissions might allow. The malicious actor may use the information to attempt several malicious activities, including account takeover, use of stolen credentials, attempt to receive free replacement items, or a variety of other actions. Although conventional systems take precautions to prevent malicious activity, there is a constant risk. Moreover, conventional computing systems provide no mechanism to determine how secure a particular endpoint is. Thus, conventional computing systems do not know whether a particular permission should be taken away from an endpoint or whether potentially malicious networking traffic should be routed away from one endpoint to a more secure endpoint.

To prevent the issues with malicious activity described above, non-conventional systems and methods described herein use machine learning and permission modifications to determine weak endpoints in a cybersecurity system. Potentially malicious network traffic may then be routed away from the weak endpoints to prevent breaches in the cybersecurity system. A computing system may adjust access permissions for software service endpoints (e.g., computing devices) or agents that operate the endpoints, based on detection of potential malicious activity. Machine learning or other approaches may be used to determine whether a user that is interacting with an endpoint or agent is potentially malicious. After determining that the user is potentially malicious, a computing system may remove or disable one or more permissions of the agent without the agent's knowledge. For example, an agent's ability to use an API may be disabled without notifying the agent, after determining that the user the agent is interacting with is potentially malicious. Even though the computing system may deny a request from the agent, the computing system may indicate (e.g., falsely indicate) to the agent that the request was successful. In this way, a computing system may determine a trust score to associate with the endpoint or agent. Future users or network traffic that are predicted to attempt malicious activity may then be routed to agents with a higher trust score. This increases the security of the computing system by enabling the computing system to prevent unauthorized access to data by the malicious actors.

In some embodiments, a computing system may obtain a data stream for a communication between a computing device associated with an agent of a service and an external device. For example, the data stream may include audio of a conversation (e.g., between the agent and an outside user) received in part from the external device. The computing system may obtain data associated with the conversation that may be used to determine whether the outside user is attempting malicious activity or not. For example, the data may include an indication of whether the external device is using a virtual private network, or the data may include an indication of whether the outside user is familiar with an interactive voice response system associated with the computing system. The obtained text and data may be provided to a machine learning model to generate a probability score indicative of whether the outside user is attempting to obtain unauthorized access or attempting other malicious activity. Based on determining that the probability score satisfies a threshold, the computing system may modify a permission (e.g., an API permission) of the agent. For example, the computing system may remove a permission of a computing system associated with the agent to perform an action. The computing system may deny the request to perform the action and may cause display of an indication that the request was successful.

Various other aspects, features, and advantages of the disclosure will be apparent through the detailed description of the disclosure and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, some structures and devices are shown in block diagram form to avoid unnecessarily obscuring the disclosure.

Figure 1:
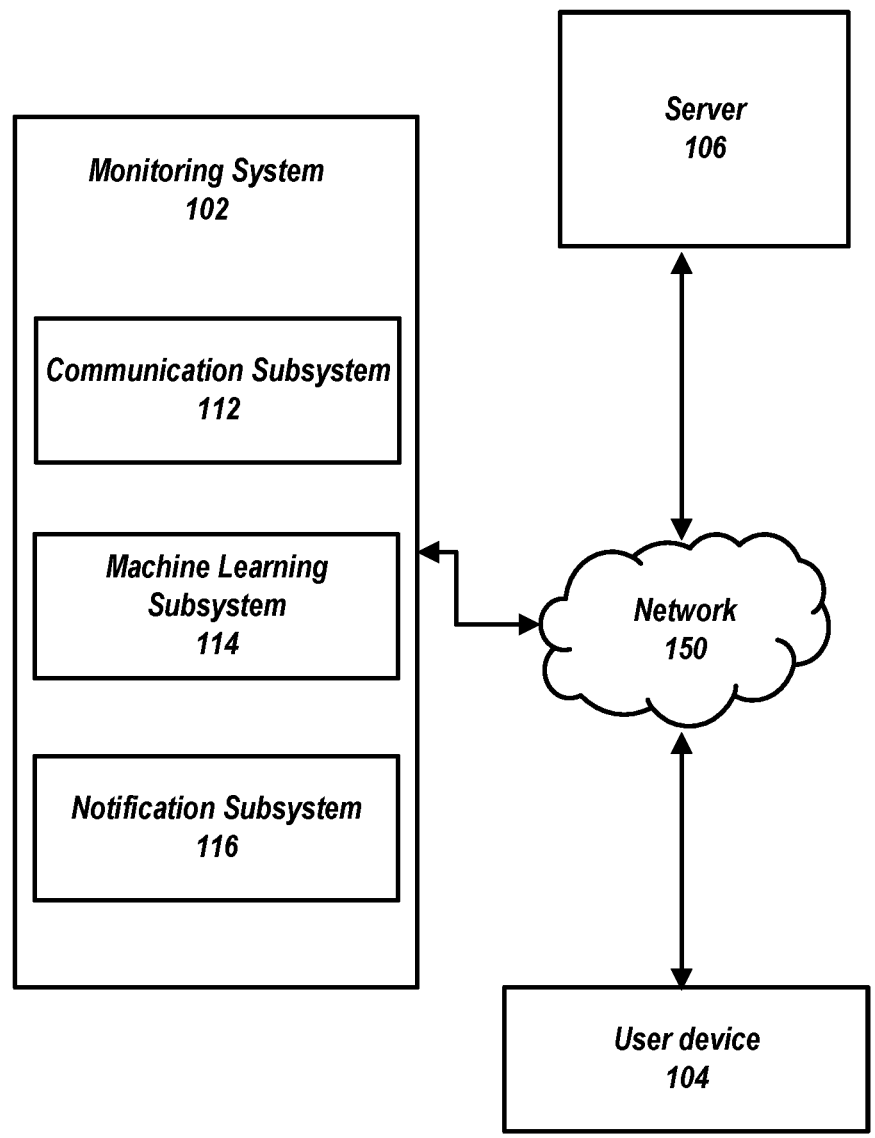
FIG. 1 shows an example system for adjusting access permissions based on detection of attempts at unauthorized access or malicious activity, in accordance with some embodiments.

FIG. 1 shows an example computing system 100 for using machine learning to adjust computing system permissions of agents that may be engaging with malicious users. The system 100 may include a monitoring system 102, a server 106, or a user device 104. The monitoring system 102 may include a communication subsystem 112, a machine learning subsystem 114, a notification system 116, or other components.

The monitoring system 102 may obtain text corresponding to a conversation between a user (e.g., an outside caller) and an agent. The conversation may include voice or text communication. For example, the conversation may occur via a phone call. Additionally, or alternatively, the conversation may occur via a chat application. In some embodiments, the monitoring system 102 may record audio of the conversation between the user and the agent. The monitoring system 102 may use natural language processing (e.g., machine learning or other techniques) to convert the audio into the text.

The monitoring system 102 may obtain data associated with the conversation. The data may be indicative of whether the user is attempting malicious activity or not. Malicious activity may include activity that seeks to compromise or impair the confidentiality, integrity, or availability of computers, information or communications systems, networks, physical or virtual infrastructure controlled by computers or information systems, or information resident thereon. Attempting malicious activity may include attempting to obtain unauthorized access to information (e.g., a user's account) via a call center or chat service (e.g., by pretending to be the user or by bribing an agent of the call center or chat service). Malicious activity may include an actor contacting an organization's call center pretending to be someone the actor is not. For example, the actor may navigate through a call center's automated filtering system to reach a customer service representative, who they trick into granting account access. This may be done using information learned about an account holder as the result of a data breach or personal identifiable information available online, or it can be accomplished by an actor misleading a customer service representative with stories of hardship in order to gain information and access. Some examples of malicious activity may include account takeover, use of stolen credentials, or an attempt to receive free replacement items.

The data that is associated with the conversation may be used as input into a machine learning model that generates a prediction indicative of whether the user is attempting malicious activity. The data may include any data discussed in connection with FIGS. 1-4.

Figure 2:
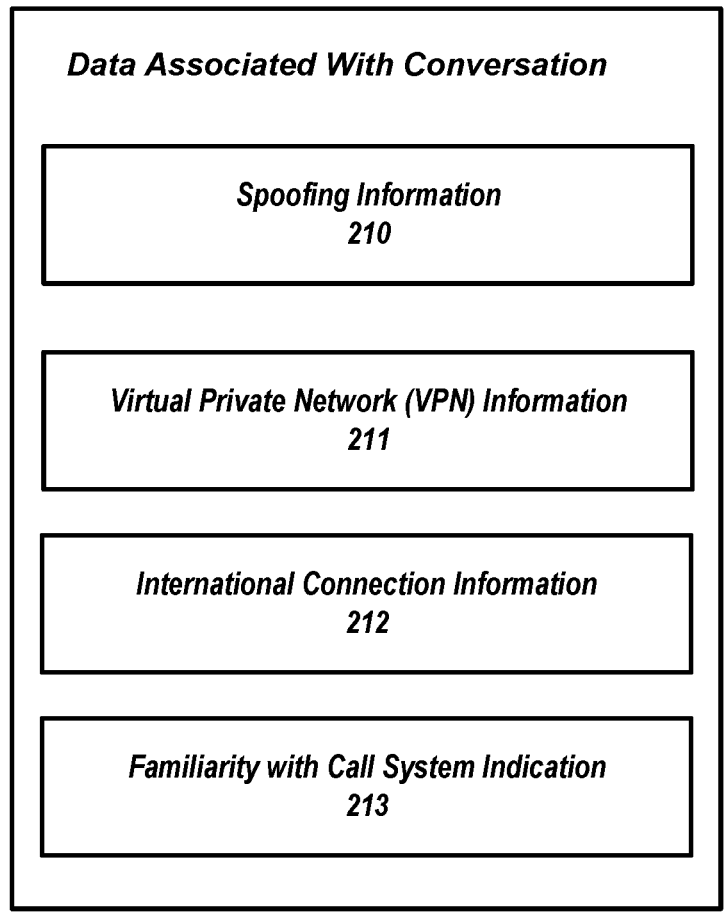
FIG. 2 shows example data that may be used to detect unauthorized access attempts or malicious activity, in accordance with some embodiments.

Referring to FIG. 2, example data 200 is shown. The data 200 may be related to a user that has called or otherwise contacted a call center. The data 200 may be obtained before the user is assigned to an agent at the call center. For example, the data may be obtained between the time at which the user calls the call center and the time at which the user begins a conversation with a call agent. One or more portions of the data 200 may be used to determine whether a user is attempting malicious activity. For example, one or more portions of the data 200 may be provided to a machine learning model as described below.

The data 200 may include spoofing information 210. The spoofing information 210 may indicate that the user is using a spoofed identification or spoofed contact information. For example, the spoofing information 210 may indicate that the user has spoofed a phone number, an email address, an Internet Protocol (IP) address, or whether the user has spoofed a variety of other identification information. The monitoring system 102 may determine that the user is attempting malicious activity, for example, based on detecting that the user is using a spoofed identification or spoofed contact information.

The data 200 may include virtual private network (VPN) information 211. The VPN information 211 may indicate whether the user is using a VPN to participate in the conversation. The VPN information may indicate what port a user is using to connect to the call center. For example, if a user is using a particular port (e.g., User Datagram Protocol (UPD) port 1194), it may indicate that the user is using a VPN. The VPN information may indicate the use of an IP address known to match a shared IP address used by a service provider. The VPN information may include information determined via deep packet inspection. The information determined via deep packet inspection may include signatures indicating the use of a VPN. The data 200 may include international connection information 212. The international connection information 212 may indicate that the user is located in a foreign country. For example, the information 212 may include an IP address of the user that indicates that the user is located in a foreign country.

The data 200 may include an indication 213 of how familiar the user is with the call system. The call system may include an interactive voice response or an automated phone menu. For example, the call system may include recorded audio that describes a menu. The user may be able to push a number to select a menu option described by the call system. The monitoring system 102 may determine the average amount of time it takes for a user to select a menu option. If the average time is below a threshold, the monitoring system 102 may determine that the user is familiar with the call system. If the average time is above a threshold, the monitoring system 102 may determine that the user is not familiar with the call system. If the user is familiar with the call system, the monitoring system 102 may determine that the user is attempting malicious activity or may be more likely to determine that the user is attempting malicious activity.

Referring back to FIG. 1, the monitoring system 102 may generate a score indicative of whether the user is malicious. The score may be based on the data 200 described above in connection with FIG. 2. For example, the monitoring system 102 may input the text and the data associated with the conversation into a machine learning model. The machine learning model may be used to generate a score (e.g., a probability score) indicative of whether the user is malicious. The score may be compared with a threshold score. If the threshold score is satisfied, the monitoring system 102 may determine that the user is malicious. For example, the machine learning model may generate a score of 0.8 based on the text and the data associated with the conversation. The monitoring system 102 may determine that the user is malicious, for example, if the threshold score is 0.6 because the score of 0.8 is greater than the threshold score.

The machine learning model may have been trained to distinguish between users that attempt malicious activity and users that do not attempt malicious activity. Training data used to train the machine learning model may include text or data associated with previous conversations. The training data may include multiple instances with the text or data as features, and a label indicating whether each instance corresponds to an attempt at malicious activity. The machine learning model may be trained, for example, as described below in connection with FIG. 3.

In some embodiments, the score may be generated based on one or more factors or a combination of factors associated with the obtained data or text. For example, one factor may include the number of keywords from a list of keywords that are present in the text. The monitoring system 102 may determine, based on a comparison of the text with a list of keywords, that the text comprises more than a threshold number of key words found in the list of keywords (e.g., more than 3, more than 5, more than 15, etc.). In response to determining that the text comprises more than the threshold number of keywords of the list of keywords, the monitoring system 102 may determine that the user is malicious.

The factors may include any of the data discussed above in connection with FIG. 2. For example, the monitoring system 102 may determine that the user is attempting malicious activity based on detecting that the user is using one or more of a spoofed identification or spoofed contact information, a VPN, or an international connection. Additionally or alternatively, the monitoring system 102 may determine that the user is attempting malicious activity based on the user's familiarity with the call system.

The monitoring system 102 may modify a permission of the agent. The permission may be associated with an account or an API. The permission may enable the agent to perform actions on behalf of users that the agent has conversed with. The monitoring system 102 may modify the permission such that the agent can no longer perform one or more actions. For example, the permission may be modified such that the agent is no longer able to open a new account for the user. The permission may be modified such that the agent is no longer able to transfer financial resources via an API associated with the server 106. The account permission may be modified such that the agent can no longer modify user profile data such as address, name, phone number, or a variety of other demographic information. The modification may be made based on determining that the user is attempting malicious activity. By modifying the permission associated with the agent, the monitoring system 102 may prevent any malicious activity that the user attempts to perform or attempts to get the agent to perform.

The modification to a permission of the agent may be made without notifying the agent. When the agent attempts to perform the action, a computing system that is used by the agent may display or send an indication that the action was successful, even though the request to perform the action was denied. This may enable the monitoring system 102 to observe the behavior of the agent and to determine a trust score that should be assigned to the agent or determine an adjustment to a trust score that was previously assigned to the agent.

The monitoring system 102 or the server 106 may receive a request to perform an action. For example, during the conversation, the agent may attempt to perform an action on behalf of the user. The agent may use one or more computing systems (e.g., the server 106) to perform the action. Performing the action may require one or more permissions. For example, an API that may be required to perform the action may require credentials (e.g., a token) of the agent for the API to complete the action. The request to perform the action may be received even if one or more permissions required for the action were removed or modified. For example, despite a lack of permission to perform an action, a computing system associated with the agent may be able to send a request to perform the action.

The monitoring system 102 or server 106 may deny requests made by agents during conversations with users (e.g., users that are attempting malicious activity). The request may be denied based on the modified account permission. For example, the request may be denied because it was determined that the user was attempting malicious activity. Additionally, the computing system may display an indication that the action was performed to the agent, even though the action was not performed.

The monitoring system 102 may send an indication that the request was successful or that the action was successfully completed, even though the request was actually denied. For example, the monitoring system 102 may send a notification to the computing system associated with the agent. The computing system associated with the agent may display the notification indicating that the action was successfully completed (e.g., even though the request was not approved).

The monitoring system 102 may generate trust scores for each agent. A trust score may indicate whether a user that has been determined to be attempting malicious activity should be routed to the agent. A trust score may be generated or adjusted based on whether the agent tries to make a request during a conversation with a user that has been determined to be attempting malicious activity. The monitoring system 102 may adjust a trust score associated with the agent, for example, based on receiving the request to perform the action from the computing system associated with the agent.

In some embodiments, the monitoring system 102 may determine that a user is attempting to obtain unauthorized access. Based on determining that the user is attempting to obtain unauthorized access, the monitoring system 102 may select an agent from a set of agents with a high trust score (e.g., a trust score that is higher than a threshold trust score) to assign the user to. The agent with the higher trust score may be more likely to assist the user in an appropriate manner. Additionally or alternatively, the monitoring system 102 may select an agent from the set of agents based on a determination that a trust score of the selected agent is greater than other trust scores corresponding to other agents in the set of agents. For example, the selected agent may have the highest trust score in the set of agents. In some embodiments, the monitoring system 102 may generate a probability score associated with an incoming contact request (e.g., phone call, email, text message, chat message, etc.). The probability may indicate whether a user of the incoming contact request is attempting malicious activity. Based on determining that the probability score satisfies a threshold, the monitoring system 102 may route the second call away from the agent, for example, because the agent has a trust score that is lower than a threshold trust score.

The user device 104 may be any computing device, including, but not limited to, a laptop computer, a tablet computer, a hand-held computer, smartphone, other computer equipment (e.g., a server or virtual server), including "smart," wireless, wearable, or mobile devices. The monitoring system 102 may include one or more computing devices described above or may include any type of mobile terminal, fixed terminal, or other device. For example, the monitoring system 102 may be implemented as a cloud-computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the monitoring system 102, those operations may be performed by components of the user device 104, or server 106. In some embodiments, the various computers and systems described herein may include one or more computing devices that are programmed to perform the described functions.

One or more components of the monitoring system 102, user device 104, or server 106, may receive content or data via input/output (I/O) paths. The one or more components of the monitoring system 102, the user device 104, or the server 106 may include processors or control circuitry to send and receive commands, requests, and other suitable data using the I/O paths. The control circuitry may include any suitable processing, storage, or I/O circuitry. Each of these devices may include a user input interface or user output interface (e.g., a display) for use in receiving and displaying data. It should be noted that in some embodiments, the monitoring system 102, the user device 104, or the server 106 may have neither user input interfaces nor displays and may instead receive and display content using another device (e.g., a dedicated display device such as a computer screen or a dedicated input device such as a remote control, mouse, voice input, etc.).

One or more components or devices in the system 100 may include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a universal serial bus (USB) port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical charge-based storage media (e.g., EEPROM, random access memory (RAM), etc.), solid-state storage media (e.g., flash drive, etc.), or other electronically readable storage media. The electronic storages may include one or more virtual storage resources (e.g., cloud storage, a VPN, or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a satellite network, a combination of these networks, or other types of communications networks or combinations of communications networks. The devices in FIG. 1 (e.g., monitoring system 102, the user device 104, or the server 106) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, or firmware components operating together. For example, the monitoring system 102, any component of the processing system (e.g., the communication subsystem 112, the ML subsystem 114, or the memory buffer 116), the user device 104, or the server 106 may be implemented by one or more computing platforms.

Figure 3:
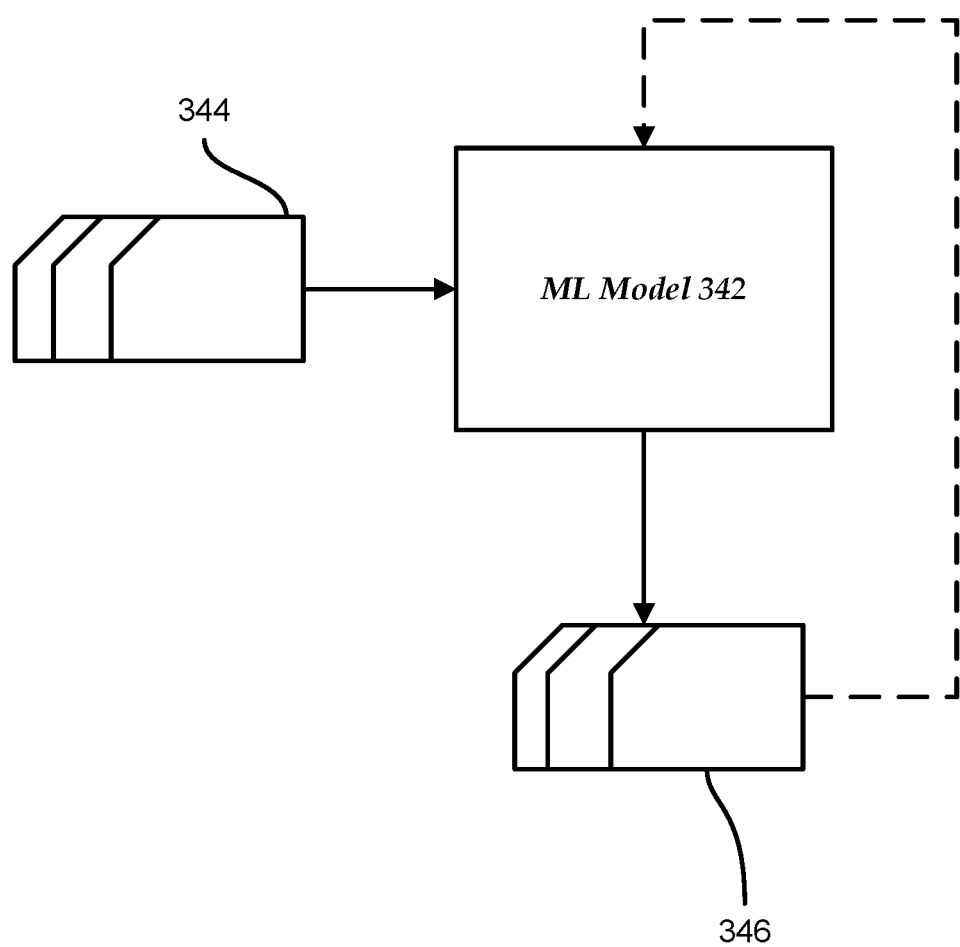
FIG. 3 shows an example machine learning model, in accordance with some embodiments.

One or more machine learning models discussed above may be implemented (e.g., in part), for example, as shown in FIGS. 1-3. With respect to FIG. 3, machine learning model 342 may take inputs 344 and provide outputs 346. In one use case, outputs 346 may be fed back to machine learning model 342 as input to train machine learning model 342 (e.g., alone or in conjunction with user indications of the accuracy of outputs 346, labels associated with the inputs, or with other reference feedback information). In another use case, machine learning model 342 may update its configurations (e.g., weights, biases, or other parameters) based on its assessment of its prediction (e.g., outputs 346) and reference feedback information (e.g., user indication of accuracy, reference labels, or other information). In another example use case, machine learning model 342 is a neural network and connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 342 may be trained to determine whether a user is attempting to obtain unauthorized access to a computing system or is attempting malicious activity.

In some embodiments, the machine learning model 342 may include an artificial neural network. In some embodiments, machine learning model 342 may include an input layer and one or more hidden layers. Each neural unit of the machine learning model may be connected with one or more other neural units of the machine learning model 342. Such connections can be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model 342 may be self-learning or trained, rather than explicitly programmed, and may perform significantly better in certain areas of problem solving, as compared to computer programs that do not use machine learning. During training, an output layer of the machine learning model 342 may correspond to a classification, and an input known to correspond to that classification may be input into an input layer of the machine learning model during training. During testing, an input without a known classification may be input into the input layer, and a determined classification may be output. For example, the classification may be an indication of whether an action is predicted to be completed by a corresponding deadline or not. The machine learning model 342 trained by the machine learning subsystem 114 may include one or more embedding layers at which information or data (e.g., any data or information discussed above in connection with FIGS. 1-3) is converted into one or more vector representations. The one or more vector representations of the message may be pooled at one or more subsequent layers to convert the one or more vector representations into a single vector representation.

The machine learning model 342 may be structured as a factorization machine model. The machine learning model 342 may be a non-linear model or supervised learning model that can perform classification or regression. For example, the machine learning model 342 may be a general-purpose supervised learning algorithm that the system uses for both classification and regression tasks. Alternatively, the machine learning model 342 may include a Bayesian model configured to perform variational inference. The machine learning model 342 may be configured to determine whether two datasets are similar, to generate a vector representation of a dataset or a portion of a dataset, or a variety of other functions described above in connection with FIGS. 1-2B.

Figure 4:
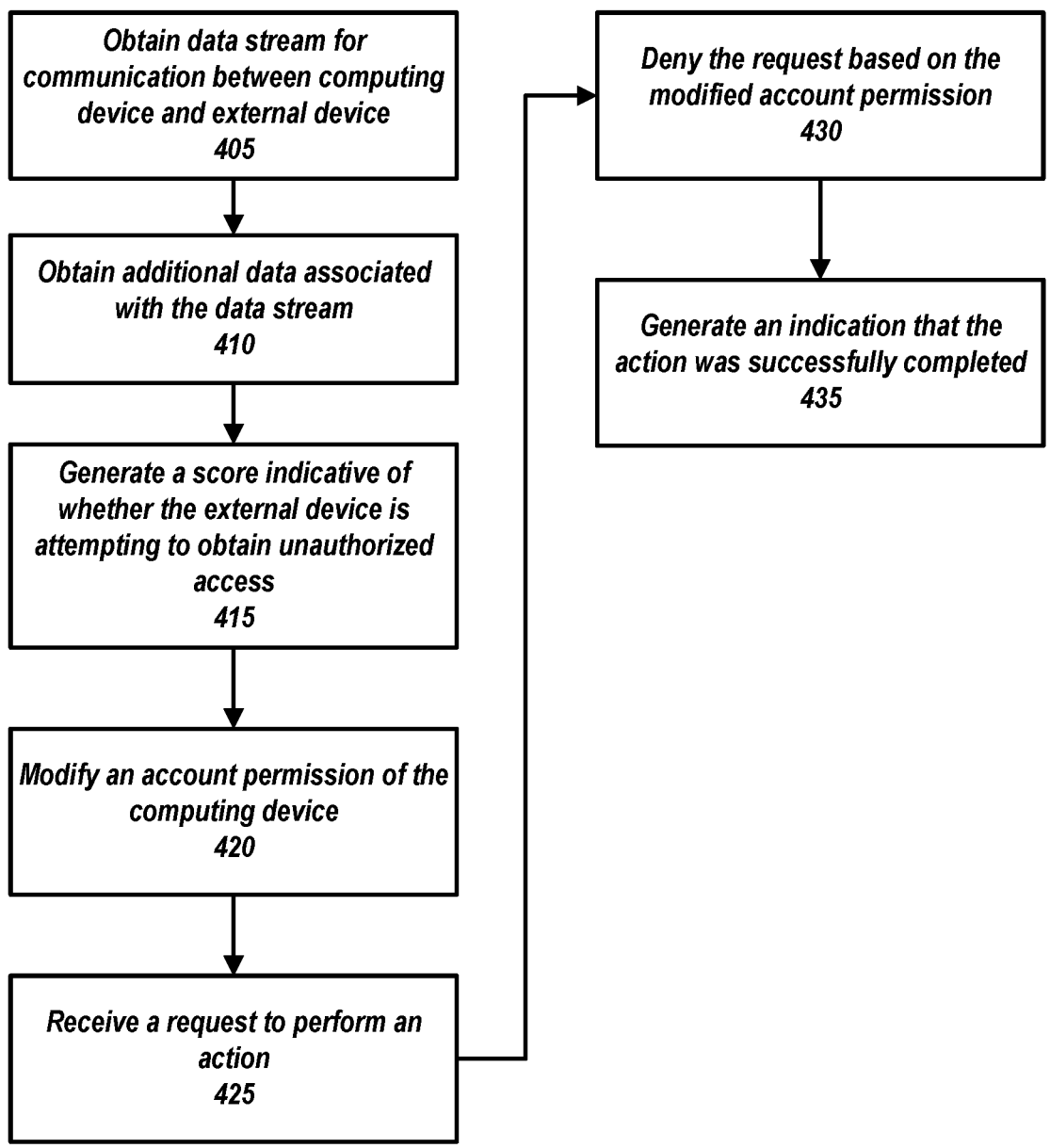
FIG. 4 shows an example flowchart of the actions involved in adjusting access permissions for agents based on detection of attempts at unauthorized access or malicious activity, in accordance with some embodiments.

FIG. 4 is an example flowchart of processing operations of a method that enables the various features and functionality of the systems as described in detail above. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

Figure 5:
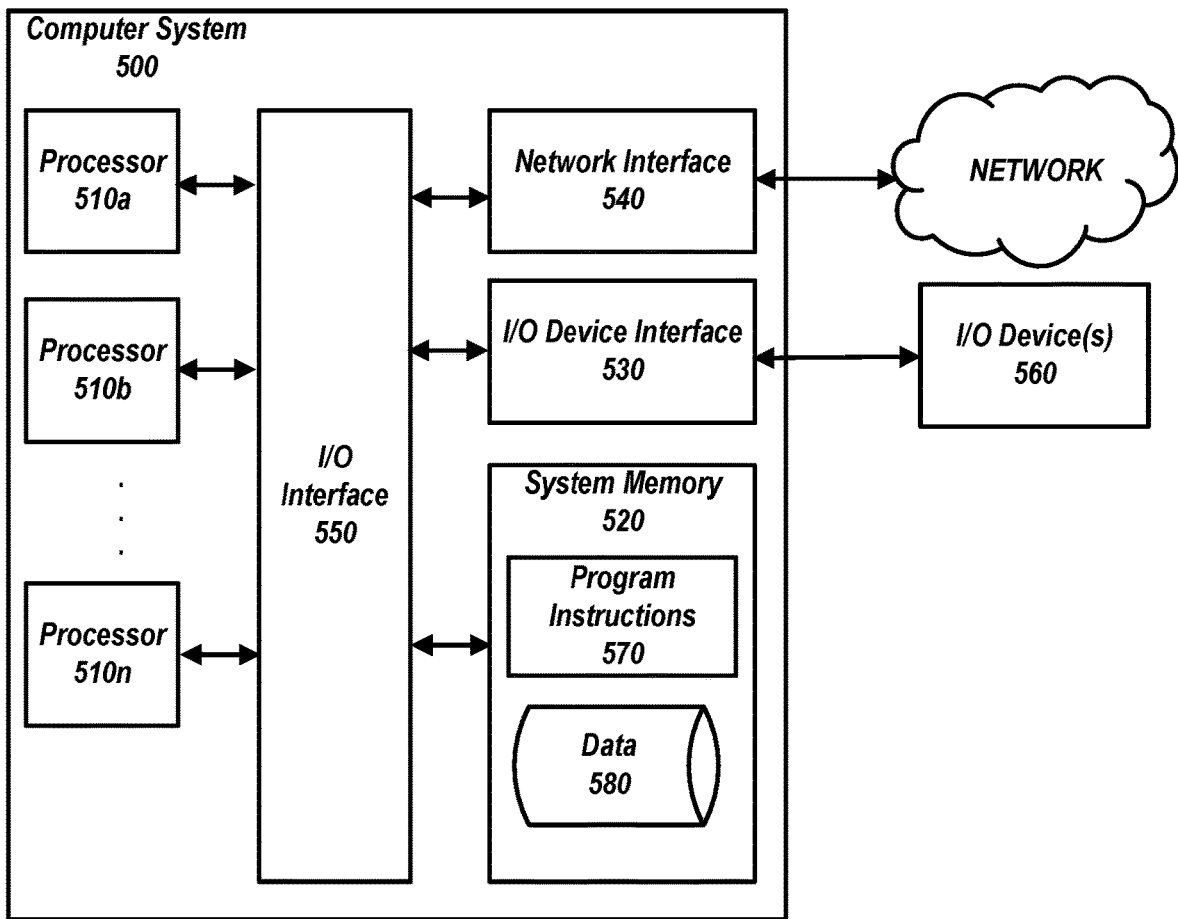
FIG. 5 shows an example computing system that may be used in accordance with some embodiments.

In some embodiments, the method may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods. It should be noted that the operations performed by monitoring system 102 may be performed using one or more components in system 100 (FIG. 1) or computer system 500 (FIG. 5).

FIG. 4 shows an example flowchart of the actions involved in using machine learning to detect attempts at malicious activity and modify computer system permissions. For example, process 400 may represent the actions taken by one or more devices shown in FIGS. 1-3 and described above. At 405, monitoring system 102 may obtain a data stream for a communication between a computing device and an external device. The data stream may be a phone call. The monitoring system 102 may obtain text corresponding to audio of a phone call between a user and an agent. The monitoring system 102 may record audio of a conversation between the user and the agent. The monitoring system 102 may use natural language processing (e.g., machine learning or other techniques) to convert the audio into the text.

At 410, monitoring system 102 may obtain data associated with the data stream (e.g., phone call). The data may be indicative of whether the user is attempting malicious activity or not. For example, the data may include an indication of whether the user is using a VPN, an indication of a familiarity level with an interactive voice response system associated with the phone call, or any other data discussed above in connection with FIGS. 1-3. The data may be used as input into a machine learning model that generates a prediction indicative of whether the user is attempting unauthorized access or other malicious activity (e.g., as defined above in connection with FIG. 1).

At 415, monitoring system 102 may generate a score indicative of whether the user is attempting unauthorized access or other malicious activity. For example, the monitoring system 102 may input the text and the data associated with the phone call into a machine learning model. The machine learning model may be used to generate a score (e.g., a probability score) indicative of whether the user is attempting unauthorized access or other malicious activity. The score may be compared with a threshold score. If the threshold score is satisfied, the monitoring system 102 may determine that the user is attempting unauthorized access or other malicious activity. For example, the machine learning model may generate a score of 0.8 based on the text and the data associated with the phone call. The monitoring system 102 may determine that the user is attempting unauthorized access or other malicious activity, for example, if the threshold score is because the score of 0.8 is greater than the threshold score.

In some embodiments, the score may be generated based on one or more factors associated with the data obtained at 410 or the text obtained at 405. For example, one factor may include the number of keywords from a list of keywords that are present in the text. The monitoring system 102 may determine, based on a comparison of the text with a list of keywords, that the text comprises more than a threshold number of key words found in the list of keywords (e.g., more than 3, more than 5, more than 15, etc.). In response to determining that the text comprises more than the threshold number of keywords of the list of keywords, the monitoring system 102 may determine that the user is attempting unauthorized access or other malicious activity. Other factors may include those discussed in connection with FIGS. 1-2 above.

At 420, monitoring system 102 may modify an account permission of the agent or a computing device of the agent. The account permission may be associated with an API. The monitoring system 102 may modify the account or API permission such that the agent can no longer perform one or more actions. For example, the account permission may be modified such that the agent is no longer able to open a new account for the user. The account permission may be modified such that the agent is no longer able to transfer financial resources via an API associated with the server 106. The account permission may be modified such that the agent can no longer modify user profile data such as address, name, phone number, or a variety of other demographic information. The modification may be made based on determining that the user is attempting unauthorized access or other malicious activity. By modifying the permission associated with the agent, the monitoring system 102 may prevent any malicious activity (e.g., unauthorized access) that the user attempts to perform or attempts to get the agent to perform.

The modification to a permission of the agent may be made without notifying the agent. When the agent attempts to perform the action, a computing system that is used by the agent may display or send an indication that the action was successful, even though the request to perform the action was denied. This may enable the monitoring system 102 to observe the behavior of the agent and to determine a trust score that should be assigned to the agent or determine an adjustment to a trust score that was previously assigned to the agent.

At 425, monitoring system 102 may receive a request to perform an action. For example, during the phone call, the agent may attempt to perform an action on behalf of the user.

The agent may use one or more computing systems (e.g., the server 106) to perform the action. Performing the action may require one or more permissions. For example, an API that may be required to perform the action may require credentials (e.g., a token) of the agent for the API to complete the action. The request to perform the action may be received even if one or more permissions required for the action were removed or modified at 420. For example, despite a lack of permission to perform an action, a computing system associated with the agent may be able to send a request to perform the action. Additionally, the computing system may display an indication that the action was performed to the agent, even though the action was not performed.

At 430, the monitoring system 102 may deny the request received at 425. The request may be denied based on the modified account permission. For example, the request may be denied because the user was determined to be attempting unauthorized access or other malicious activity. To prevent any unauthorized access or other malicious activity that the user or agent may attempt, permissions to perform one or more actions may be revoked and any request to perform them may be denied by the monitoring system 102.

At 435, the monitoring system 102 may send an indication that the request was successful or that the action was successfully completed. For example, the monitoring system 102 may send a notification to the computing system associated with the agent. The computing system associated with the agent may display the notification indicating that the action was successfully completed.

It is contemplated that the actions or descriptions of FIG. 4 may be used with any other embodiment of this disclosure. In addition, the actions and descriptions described in relation to FIG. 4 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-3 or FIG. 5 could be used to perform one or more of the actions in FIG. 4.

FIG. 5 is a diagram that illustrates an exemplary computing system 500 in accordance with embodiments of the present technique. Various portions of systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an I/O device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and an apparatus can also be implemented as, special purpose logic circuitry, for example, an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on a remote computer system, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. Non-transitory computer-readable storage media may include non-volatile memory (e.g., flash memory, ROM, PROM, EPROM, EEPROM memory), volatile memory (e.g., RAM, static random access memory (SRAM), synchronous dynamic RAM (SDRAM)), bulk storage memory (e.g., CD-ROM or DVD-ROM, hard-drives), or the like. System memory 520 may include a non-transitory computer-readable storage medium that may have program instructions stored thereon that are executable by a computer processor (e.g., one or more of processors 510a-510n) to cause the subject matter and the functional operations described herein. A memory (e.g., system memory 520) may include a single memory device or a plurality of memory devices (e.g., distributed memory devices).

I/O interface 550 may be configured to coordinate I/O traffic between processors 510a-510n, system memory 520, network interface 540, I/O devices 560, or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the peripheral component interconnect (PCI) bus standard or the USB standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a global positioning system (GPS), or the like. Computer system 500 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. In some embodiments, some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

Due to cost constraints, some features disclosed herein may not be presently claimed and may be claimed in later filings, such as in continuation applications or by amending the present claims. Similarly, due to space constraints, neither the Abstract nor the Summary section of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the content explicitly indicates otherwise. Thus, for example, reference to "an element" or "the element" includes a combination of two or more elements, notwithstanding use of other terms and phrases for one or more elements, such as "one or more." The term "or" is, unless indicated otherwise, non-exclusive (i.e., encompassing both "and" and "or"). Terms describing conditional relationships, for example, "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, for example, "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both/all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

The present techniques will be better understood with reference to the following enumerated embodiments:

1. A method comprising: obtaining text corresponding to audio of a phone call, wherein the text comprises a conversation between a user and an agent; obtaining data associated with the phone call, wherein the data indicates whether the user is attempting to obtain unauthorized access; determining, based on the data and the text, whether the user is attempting to obtain unauthorized access; based on determining that the user is attempting to obtain unauthorized access, modifying a permission associated with the agent; based on modifying the permission of the agent, denying a request to perform an action, wherein the request is received from a computing system associated with the agent; and based on denying the request, generating an indication that the request was successful.
2. The method of the preceding embodiment, wherein determining based on the data and the text, whether the user is attempting to obtain unauthorized access comprises: inputting the data and the text into a machine learning model; generating, via the machine learning model, a probability score indicative of whether the user is attempting to obtain unauthorized access; and based on determining that the probability score satisfies a threshold, determining that the user is attempting to obtain unauthorized access.
3. The method of any of the preceding embodiments, wherein modifying a permission associated with the agent comprises removing a permission to modify a database associated with the user.
4. The method of any of the preceding embodiments, wherein determining whether the user is attempting to obtain unauthorized access comprises: determining, based on a comparison of the text with a list of keywords, that the text comprises one or more keywords of the list of keywords; and in response to determining that the text comprises one or more keywords of the list of keywords, determining that the user is attempting to obtain unauthorized access.
5. The method of any of the preceding embodiments, further comprising: determining that a second user associated with a second phone call is attempting to obtain unauthorized access; and based on determining that the second user is attempting to obtain unauthorized access, selecting a second agent from a set of agents based on a determination that a trust score of the second agent is greater than other trust scores corresponding to other agents in the set of agents.
6. The method of any of the preceding embodiments, further comprising: based on receiving the request to perform the action from the computing system associated with the agent, adjusting a trust score associated with the agent.
7. The method of any of the preceding embodiments, wherein the data associated with the phone call further comprises an indication that the user is using an international connection to participate in the phone call.
8. The method of any of the preceding embodiments, further comprising: generating a second probability score associated with a second phone call; and based on determining that the second probability score satisfies a threshold, routing the second phone call away from the agent.
9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

What is claimed is:

1. A system for improving cyber security for a software service by adjusting access permissions for agents of the software service based on detection of malicious activity, the system comprising:
one or more hardware processors programmed with computer program instructions that, when executed by the one or more hardware processors, cause operations comprising:
obtaining a data stream for a communication between a computing device associated with an agent of a service and an external device, wherein the data stream indicates use of a virtual private network by the external device;
processing the data stream using a machine learning model to generate a probability score indicative of whether the external device is attempting to obtain unauthorized access to the service;
based on determining that the probability score satisfies a threshold, modifying an application programming interface (API) permission of the agent, wherein the modifying removes an access permission of the computing device associated with the agent to perform an action;
based on modifying the API permission of the agent and based on receiving a request to perform the action from the computing device associated with the agent, denying the request; and
based on denying the request, causing display, via the computing device associated with the agent, an indication that the request was successful.

2. The system of claim 1, wherein the computer program instructions, when executed, cause operations further comprising:
based on receiving the request to perform the action from the computing device associated with the agent, adjusting a trust score associated with the agent.

3. The system of claim 1, wherein the data stream comprises an indication that the external device is located outside a country associated with the computing device.

4. The system of claim 1, wherein the computer program instructions, when executed, cause operations further comprising:
generating, via the machine learning model, a second probability score associated with a second data stream; and
based on determining that the second probability score satisfies the threshold, routing the second data stream away from the agent.

5. A method comprising:
obtaining a data stream for a communication, wherein the data stream comprises natural language processing information of a conversation between a user and an agent;
obtaining data associated with the data stream, wherein the data indicates whether the user is attempting to obtain unauthorized access to a service associated with a computing device of the agent;
determining, based on the data and the natural language processing information, whether the user is attempting to obtain unauthorized access to the service,
wherein the determining comprises:
inputting the data and the natural language processing information into a machine learning model;
generating, via the machine learning model, an indication of whether the user is attempting to obtain unauthorized access; and
based on the generated indication, determining that the user is attempting to obtain unauthorized access to the service;
based on determining that the user is attempting to obtain unauthorized access to the service, modifying a permission associated with the agent;
based on modifying the permission associated with the agent, denying a request to perform an action, wherein the request is received from a computing system associated with the agent; and
based on denying the request, generating an indication that the request was successful.

6. The method of claim 5, wherein modifying the permission associated with the agent comprises removing a permission to modify a database associated with the user.

7. The method of claim 5, wherein determining whether the user is attempting to obtain unauthorized access comprises:
determining, based on a comparison of the natural language processing information with a list of keywords, that the natural language processing information comprises one or more keywords of the list of keywords; and
in response to determining that the natural language processing information comprises one or more keywords of the list of keywords, determining that the user is attempting to obtain unauthorized access.

8. The method of claim 5, further comprising:
determining that a second user associated with a second data stream is attempting to obtain unauthorized access; and
based on determining that the second user is attempting to obtain unauthorized access, selecting a second agent from a set of agents based on a determination that a trust score of the second agent is greater than other trust scores corresponding to other agents in the set of agents.

9. The method of claim 5, further comprising:
based on receiving the request to perform the action from the computing system associated with the agent, adjusting a trust score associated with the agent.

10. The method of claim 5, wherein the data stream comprises an indication that the user is located outside a country associated with the computing device of the agent.

11. The method of claim 5, further comprising:
generating a second probability score associated with a second data stream; and
based on determining that the second probability score satisfies a threshold, routing the second data stream away from the agent.

12. A non-transitory, computer-readable medium comprising instructions that, when executed by one or more processors, causes operations comprising:
obtaining a data stream for a communication, wherein the data stream comprises natural language processing information of a conversation between a user and an agent;

obtaining data associated with the data stream, wherein the data indicates whether the user is attempting to obtain unauthorized access to a service associated with a computing device of the agent;

determining, based on the data and the natural language processing information, whether the user is attempting to obtain unauthorized access to the service, wherein the determining comprises:

inputting the data and the natural language processing information into a machine learning model;

generating, via the machine learning model, an indication of whether the user is attempting to obtain unauthorized access; and based on the generated indication, determining that the user is attempting to obtain unauthorized access to the service;

based on determining that the user is attempting to obtain unauthorized access to the service, modifying a permission associated with the agent;

based on modifying the permission associated with the agent, denying a request to perform an action, wherein the request is received from a computing system associated with the agent; and based on denying the request, generating an indication that the request was successful.

13. The medium of claim 12, wherein modifying the permission associated with the agent comprises removing a permission to modify a database associated with the user.

14. The medium of claim 12, wherein determining whether the user is attempting to obtain unauthorized access comprises:

determining, based on a comparison of the natural language processing information with a list of keywords, that the natural language processing information comprises one or more keywords of the list of keywords; and in response to determining that the natural language processing information comprises one or more keywords of the list of keywords, determining that the user is attempting to obtain unauthorized access.

15. The medium of claim 12, wherein the instructions, when executed, cause operations further comprising:

determining that a second user associated with a second data stream is attempting to obtain unauthorized access; and based on determining that the second user is attempting to obtain unauthorized access, selecting a second agent from a set of agents based on a determination that a trust score of the second agent is greater than other trust scores corresponding to other agents in the set of agents.

16. The medium of claim 12, wherein the instructions, when executed, cause operations further comprising:

based on receiving the request to perform the action from the computing system associated with the agent, adjusting a trust score associated with the agent.

17. The medium of claim 12, wherein the data stream comprises an indication that the user is located outside a country associated with the computing device of the agent.

18. The medium of claim 12, wherein the instructions, when executed, cause operations further comprising:

generating a second probability score associated with a second data stream; and based on determining that the second probability score satisfies a threshold, routing the second data stream away from the agent.

* * * * *